United States Patent [19]

Fezio

[11] Patent Number: 4,690,850
[45] Date of Patent: Sep. 1, 1987

[54] FIBER REINFORCED BRAIDED SKI CORE AND METHOD AND APPARATUS FOR MAKING SAME

[75] Inventor: Louis J. Fezio, Vashon Island, Wash.

[73] Assignee: K-2 Corporation, Vashon Island, Wash.

[21] Appl. No.: 871,443

[22] Filed: Jun. 6, 1986

[51] Int. Cl.⁴ .................. B32B 5/12; B32B 17/02; A63C 5/00
[52] U.S. Cl. .................. 428/105; 428/107; 428/112; 428/111; 428/113; 428/119; 428/228; 428/225; 280/610; 87/7; 87/8
[58] Field of Search .................. 87/1, 6, 7, 8, 13; 428/32, 37, 105, 107, 108, 111, 112, 113, 119, 228, 225, 245; 280/610

[56] References Cited

U.S. PATENT DOCUMENTS

| | | |
|---|---|---|
| 273,847 | 3/1883 | Hunzinger .................. 87/7 |
| 1,820,934 | 9/1931 | Buhler .................. 87/1 |
| 3,276,784 | 10/1966 | Anderson, Jr. . |
| 3,322,435 | 5/1967 | Kirschner . |
| 3,393,918 | 7/1968 | Styka . |
| 3,490,983 | 1/1970 | Lee . |
| 3,740,301 | 6/1973 | Manning et al. . |
| 3,844,576 | 10/1974 | Schultes . |
| 3,874,972 | 4/1975 | Wesgh . |
| 3,893,681 | 7/1975 | Manning et al. . |
| 3,902,732 | 9/1975 | Fosha, Jr. et al. . |
| 4,035,000 | 7/1977 | Lacroix . |
| 4,063,838 | 12/1977 | Michael . |
| 4,094,528 | 6/1978 | Cluzel . |
| 4,197,348 | 4/1980 | Townsend . |
| 4,264,278 | 4/1981 | Weingart . |
| 4,283,446 | 8/1981 | McLain . |
| 4,381,960 | 5/1983 | Pinter et al. . |
| 4,519,290 | 5/1985 | Inman et al. .................. 428/542.8 |
| 4,529,139 | 7/1985 | Smith et al. . |

*Primary Examiner*—Nancy A. Swisher
*Attorney, Agent, or Firm*—Christensen, O'Connor, Johnson & Kindness

[57] ABSTRACT

A wrapped core for a ski comprising a wood or foamed plastic longitudinally extending core having first longitudinal strands of material positioned on the top and or bottom surfaces of the core and second strands of fiber reinforcement braided thereover to surround the core and capture said first strands. Third longitudinally extending strands of fiber reinforcement are intertwined with said second braided strands. The method and apparatus for forming the wrapped ski core.

50 Claims, 10 Drawing Figures

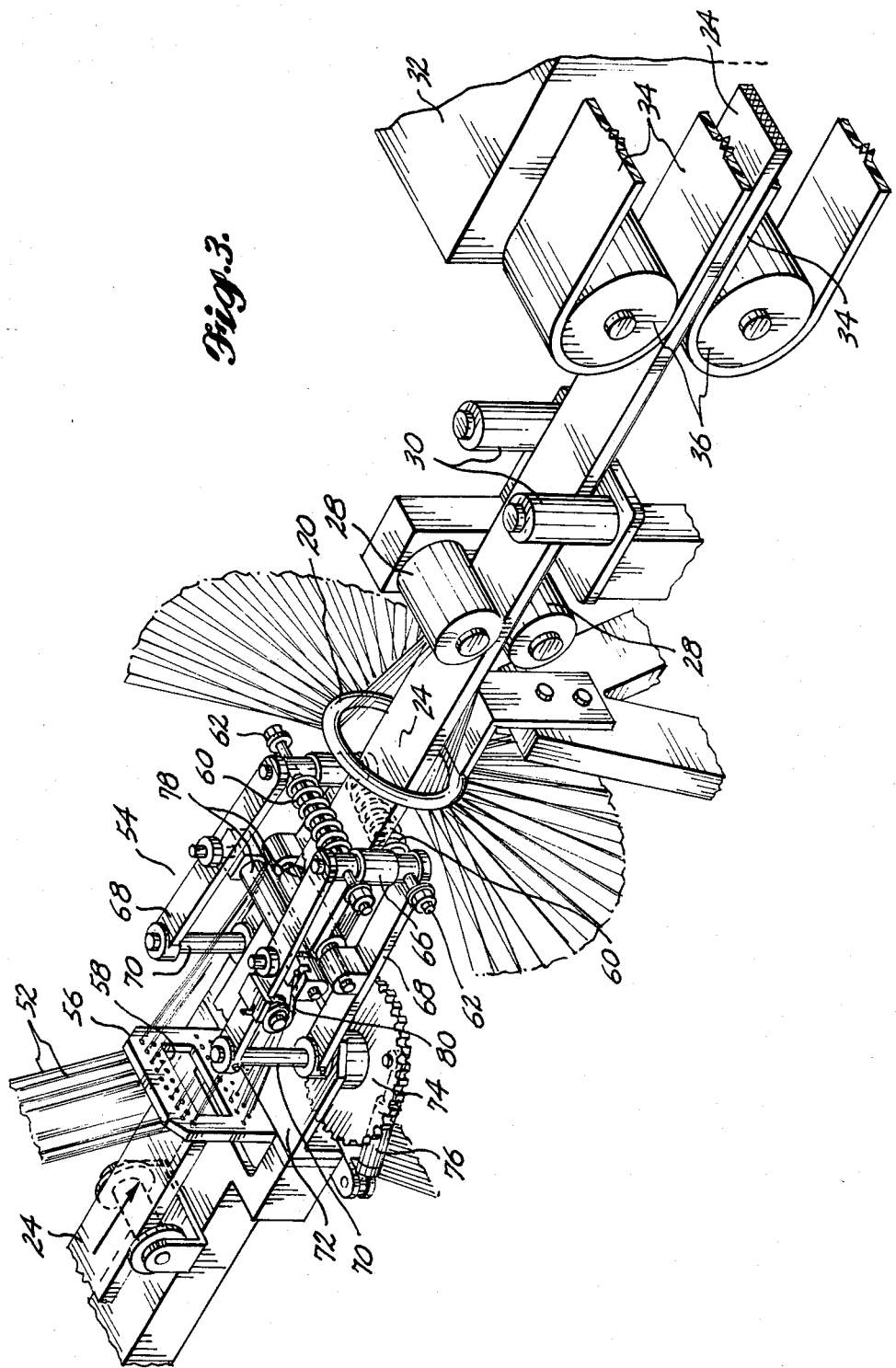

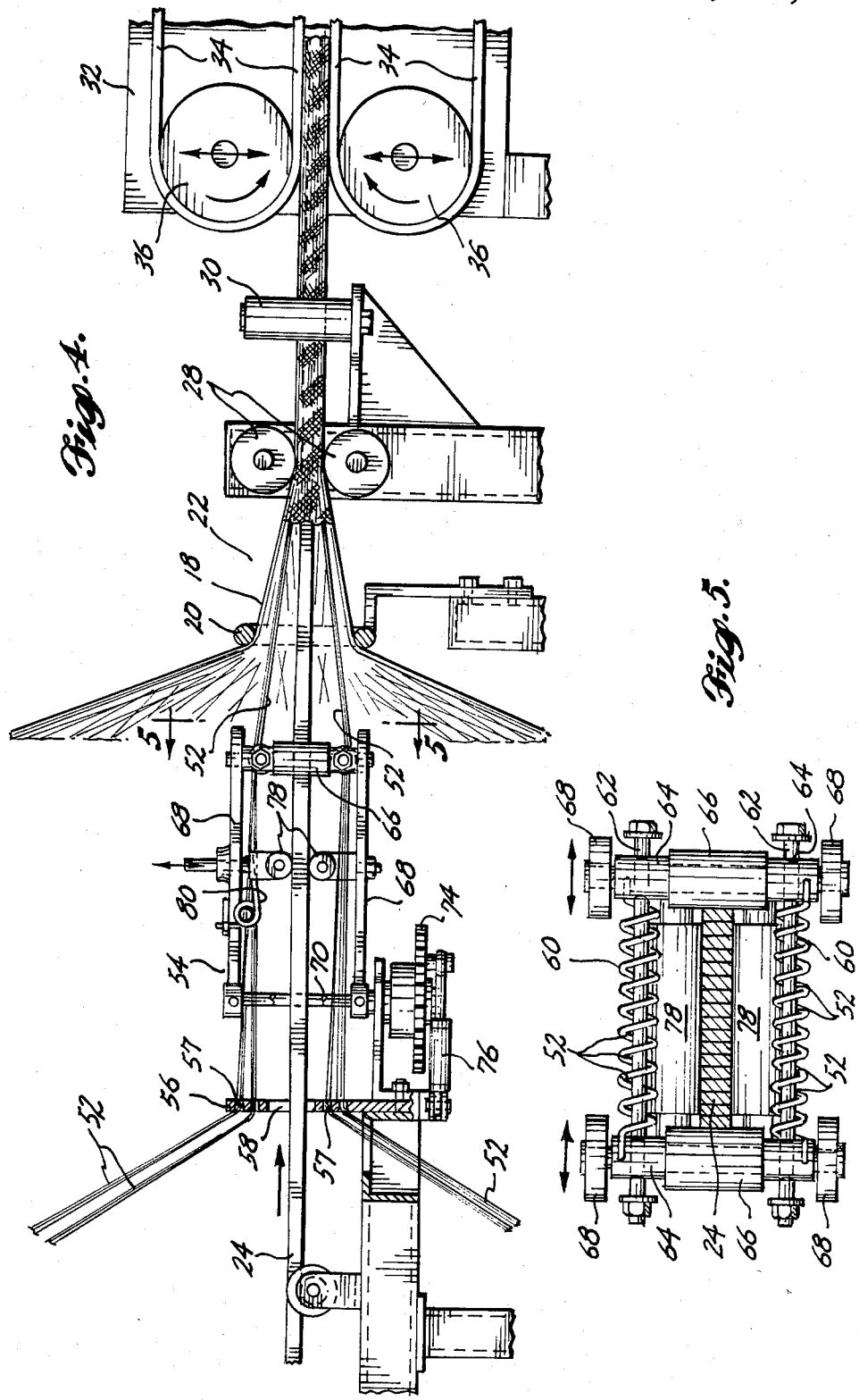

FIBER REINFORCED BRAIDED SKI CORE AND METHOD AND APPARATUS FOR MAKING SAME

TECHNICAL FIELD

The present invention relates to fiber reinforced skis in general and in particular to skis formed by the wet wrap or torsion box process wherein a wooden or foamed plastic core is wrapped in a fiber reinforced sheet impregnated with resin, "cooked" and cured under pressure in a mold with a base assembly. The invention comprises a unique braided fiber reinforced "sock" covering for a ski core which includes strands of reinforcement oriented at an angle to the longitudinal direction of the core and braided directly thereon. Longitudinally extending strands of reinforcement may be intertwined with the braided strands and other longitudinal strands of material may be positioned on the top or bottom surface of the ski core between the core and the braided reinforcement. The term "fiber reinforcement" is meant to include any highmodulus fibrous material such as glass, aramid fibers such as "Kevlar", carbon, metal wire, polyester, etc. suitable for the production of skis. A method and apparatus for manufacturing the fiber reinforced braided ski core is also disclosed.

BACKGROUND OF THE INVENTION

In the past, "wet wrap" or "torsion box" skis have typically been formed by impregnating a sheet of unidirectional fiberglass with epoxy resin. The core and any other internal components of the ski, such as fiberglass mat or a bias-ply precured fiberglass strip, are placed in the center of the unidirectional glass, again with resin applied. The unidirectional glass is then wrapped tightly around the core on all four sides. This unit is then placed in a mold, the base assembly set on top, and the mold closed. The unit is "cooked" under fairly high pressure for a period of time and, after the cure cycle, is removed from the mold. At this point, the ski is basically complete structurally and the rest of the production process is devoted to sanding, topping, finishing and other cosmetic operations. Ski cores have typically been wrapped or "laid up" by hand and this is a labor intensive and time-consuming process.

It is known that unidirectional fiberglass is a material of great longitudinal tensile strength but little lateral strength. Thus, the torsional rigidity of skis was typically increased through the addition of randomly oriented fiberglass mat or angularly biased, precured fiberglass strips to the "sock" unit prior to wrapping. The longitudinally oriented unidirectional fiberglass imparted longitudinal rigidity to the ski. It is known that the orientation of fiberglass at a 45 degree angle to the longitudinal dimension of the ski core imparts the highest torsional rigidity to the ski. Of necessity, the use of a randomly oriented mat to increase torsional rigidity also resulted in unnecessarily increasing ski weight and expense since only a small percentage of the mat fibers were oriented at angles which enhanced torsional stiffness.

The placement of 45 degree biased, precured fiberglass strips in the "sock" was an improvement in that it represented a more effective use of the strength characteristics of fiberglass in controlling torsional rigidity, but was undesirable in that it required additional lay-up and curing steps for the strips themselves. Further, the biased fiberglass was not wrapped around the core and thus did not obtain the benefits of strength and durability provided thereby.

Another problem of the prior construction technique was that variations in lay-up from ski-to-ski created differences in torsional and longitudinal rigidity, thus making it difficult to produce a truly matched pair of skis. Further the known wrap process involves wrapping a rectangular sheet of fiberglass around the ski core which has a varying cross section along its length. This creates a large overlap of the sheet at the narrow waist of the ski and a small overlap at the wide tip. This adversely affects molded tolerances in the ski.

The problems of hand lay-up have been attempted to be overcome in the past through the use of prebraided bias fiberglass socks which were slipped over a ski core prior to resin impregnation. Such socks were formed of multiple strands of fiberglass oriented at angles with respect to each other such that when the finished sock was slipped over the ski core, the strands were also oriented at angles, preferably 45 degree angles, to the ski core. Such prebraided fiberglass socks were difficult to use in that the braid tended to become loosened and unbraided while being slipped onto the ski core. In addition, the sock invariably fit loosely upon the ski core, thus creating difficulties in manufacture as well as quality control. The technique was also labor intensive and inflexible in design and still required premade contoured strips of longitudinal fiberglass.

Prebraided fiberglass socks including longitudinally extending strands of fiberglass, as well as the angularly biased strands, were successful in overcoming the tendency of the solely angularly biased strand prebraided socks to become unbraided. Such three strand socks, however, had such little ability to expand that it was extremely difficult to slip them onto a ski core and they could not be effectively used in a production process.

The present invention provides a unique ski core covering whereby strands of fiberglass are braided at preselected angles directly onto the core as the core is moved through a braiding machine. In addition, longitudinally directed strands of fiberglass may also be intertwined with the angularly biased strands during braiding. Other strands of longitudinally extending fiberglass or other desired materials may be positioned on the ski core while it is being passed through the braiding machine to allow for additional strengthing and tailoring of the flex characteristics of the ski.

The present invention makes possible a lighter and yet stronger ski in that the use of randomly oriented fiberglass is eliminated and all strands which are used are oriented longitudinally such that the best use can be made of their tensile strength characteristics.

The amount of fiberglass braided onto the ski core, as well as the angle of the braided fiberglass strands with respect to the ski core, can be varied by increasing or decreasing the speed of movement of the ski core through the braiding machine or the speed of the braiding machine itself. The equipment may be operated to allow the angle of the braided fiberglass strands with respect to the longitudinal dimension of the ski core to be varied along the ski core to separately control the torsional rigidity characteristics of the shovel or tail of a ski as desired. The braiding of the fiberglass onto the ski core under slight tension prevents unbraiding and holds the orientation of the fiberglass with respect to the ski after it is removed from the braiding machine and prior to its impregnation with epoxy and placement into a mold.

SUMMARY OF THE INVENTION

A wrapped core for a fiberglass ski is formed by passing a foamed plastic, wood or other suitable type of ski core through a braiding machine whereby angularly biased strands of fiberglass are braided directly onto the ski core to cover it from one end to the other. Prior to braiding, other strands of fiberglass, or other suitable material, may be fed onto either or both the top and bottom surfaces of the ski core as it passes into the braiding machine, such that the longitudinal strands are captured and held by the overlying braid. The apparatus for feeding the longitudinal fibers onto the top and bottom surfaces of the ski core includes means for contouring the fibers to the varying widths of the ski. Longitudinal strands of fiberglass may also be intertwined directly into the braid to increase the longitudinal rigidity of the ski.

Means are provided for varying either the speed of the braiding machine or the speed of travel of the ski core through the braiding machine to vary the angle at which the braided fibers are laid on the longitudinally extending ski core. This allows for easy control of the torsional stiffness characteristics of the ski and, thus, would allow different types of ski handling characteristics for different levels or styles of skiing to be manufactured on a single machine by simply varying the speed of movement of the ski core, the speed of the braiding machine, or modifying the amounts or types of longitudinal fibers or other materials which are laid upon the surfaces of the ski core prior to braiding.

A unique, lightweight ski is provided which makes efficient use of the high tensile strength characteristics of fiberglass by orienting all strands of fiberglass longitudinally along preselected lines to produce a ski having a maximum strength-to-weight ratio. It provides a method and apparatus for producing uniform, lightweight skis having preselected torsional and longitudinal flex characteristics.

BRIEF DESCRIPTION OF THE DRAWINGS

The details of a typical embodiment of the present invention will be described in connection with the accompanying drawings in which:

FIG. 3 is an enlarged partial perspective view of the braiding nip portion of the apparatus of the present invention;

FIG. 4 is a side elevation view of the braiding nip portion of the present invention;

FIG. 5 is a sectional view taken along lines 5—5 of FIG. 4;

DETAILED DESCRIPTION

Figure 1:
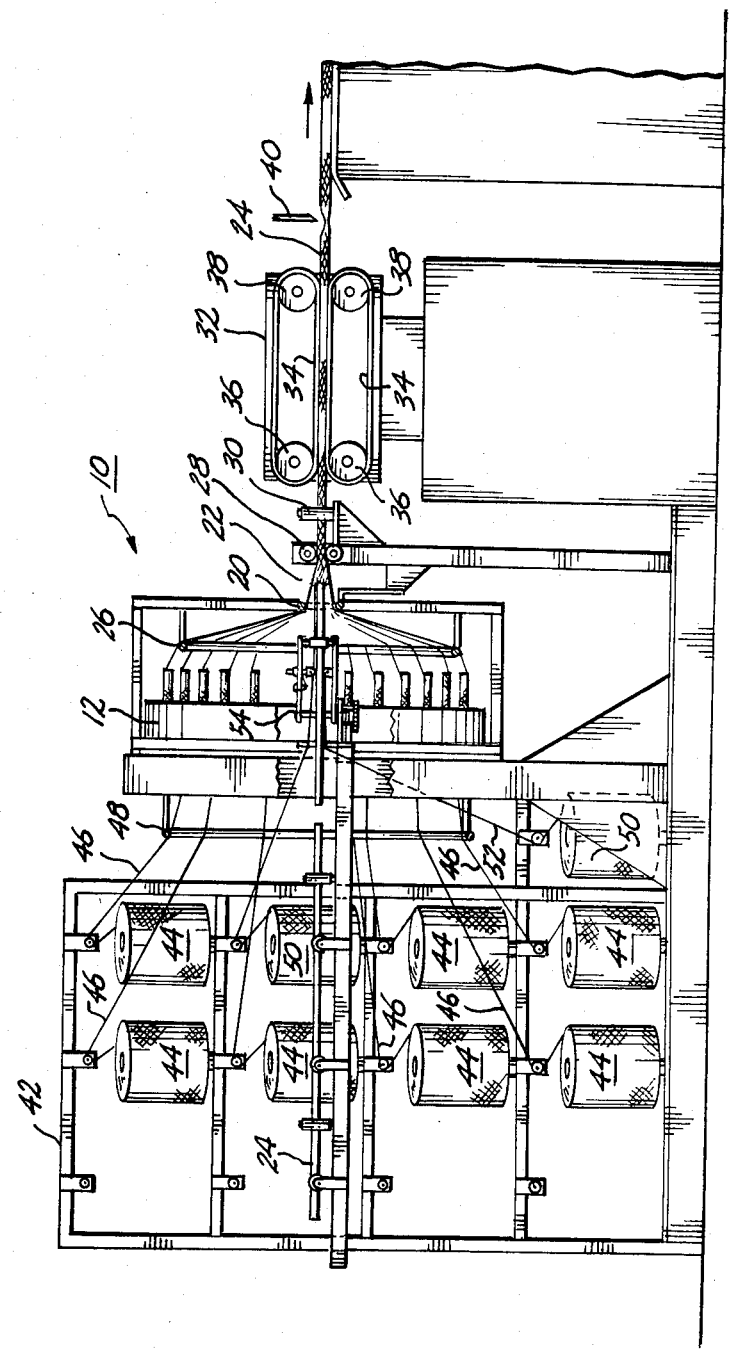
FIG. 1 is a side elevation view of one embodiment of an apparatus for producing the wrapped core of the present invention.
Figure 2:
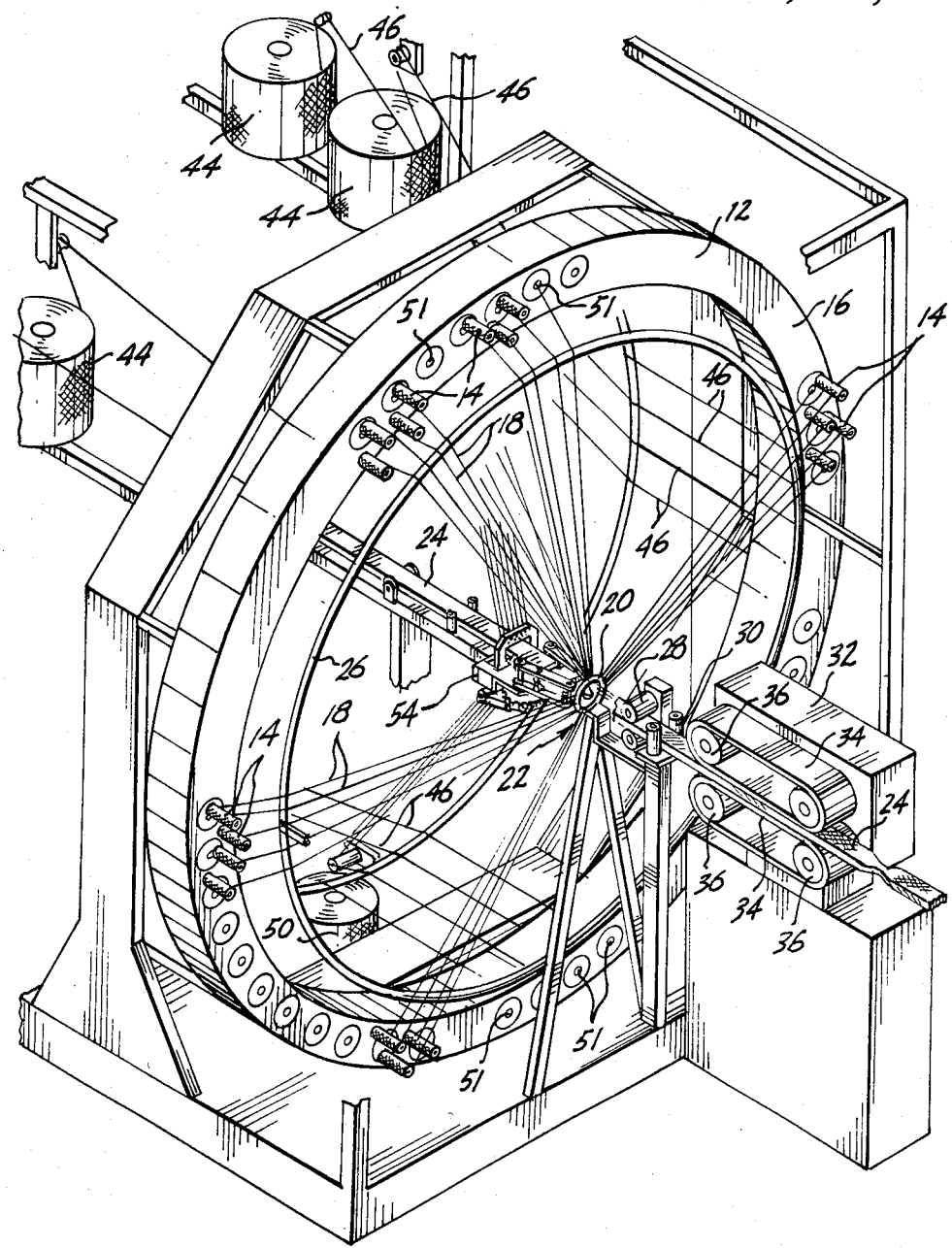
FIG. 2 is a partial perspective view of the apparatus of FIG. 1.

FIG. 1 illustrates an apparatus 10 made according to the present invention for producing a wrapped ski core. The apparatus includes a conventional braiding machine indicated generally at 12 for producing tubular braid. Such machines are commonly known as "maypole" braiders, and one source for such a machine is Mossberg Industries, Inc., 160 Bear Hill Road, Cumberland, R.I. 02864. As is best seen in FIG. 2, the braiding machine includes a plurality of spools 14 positioned on a circular peripheral track 16. The spools carry strands of fiberglass and are adapted to move over and under each other as they travel around the periphery of the track 16. The strands of fiberglass 18 extending from the spools are directed through a guide ring 20 to a braiding nip area 22 where the movement of the spools causes the strands of yarn to be wrapped in opposing helixes to produce a braid about a ski core 24 passing longitudinally through guide 20.

As illustrated, the strands of yarn initially pass over a larger outer guide ring 26, whose purpose, like that of guide ring 20, is to guide and direct the strands of fiberglass such that they are directed to the braiding nip at similar angles to allow braiding to easily occur.

Referring again to FIG. 1, it will be seen that horizontal and vertical guide rollers 28 and 30 are positioned immediately adjacent the braiding nip area to guide the braid covered ski core from the braiding knit to the haul-off apparatus 32. Haul-off apparatus 32 comprises a pair of endless belts 34 running around the pairs of rollers 36 and 38. Rollers 38 are rotatably driven. At least one pair of rollers 36 and 38 are also mounted on pneumatic cylinders or the like to allow the pairs of cylinders and overlying belts 34 to be moved toward each other to press against and grip the braid covered ski core to haul it through the braiding machine. A conventional cutting mechanism 40 is positioned outwardly of haul-off 32 to separate braid covered cores from each other. The location of the cut-off mechanism outward of the haul-off apparatus 32 and rollers 28 and 30 allow the braiding machine to braid on a continual basis by maintaining tension in the strands running from the bobbins on the braiding machine. The tension at which the strands are removed from the spools for braiding is about 0.25 pounds but may be any reasonably larger or smaller number so long as the machine braids effectively and the orientation of the strands on the core is maintained.

Figure 7:
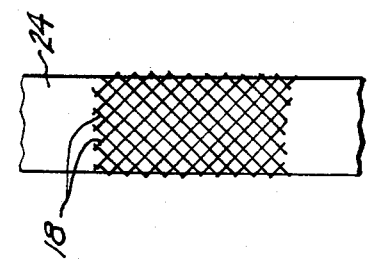
FIG. 7 is a plan view of a portion of a ski core showing angularly biased braid positioned thereon.

Operation of the braiding machine 12 to braid angularly biased strands of fiberglass about ski core 24 produces a ski core covered in angularly biased braid, such as that shown in FIG. 7. The fiberglass strands may be oriented at a variety of angles with respect to the longitudinal direction of the ski core with it being understood that maximum torsional stiffness occurs when the braid fibers are oriented at a 45 degree angle to the ski core.

It will be understood that the thickness or thinness of the foamed plastic or wooden core over which the braid is laid grossly controls both the longitudinal and torsional flex of a ski at any point along its length. The thinner a ski core at any point, the less stiff it is. The ability to control the angle at which the braided fibers are placed on the ski by the apparatus of the present invention allows, for the first time, separate control of the longitudinal and torsional flex characteristics of a ski. For example, as the speed of movement of a ski core through the braiding machine 12 is increased, the angle at which the knitted fibers are laid on the ski core with respect to the longitudinal dimension of the ski core is lowered, i.e., the braided strands move toward longitudinal alignment with the ski core and, thus, the longitudinal stiffness of the ski increases while the torsional rigidity is reduced. Such independent control of these two flex characteristics was not possible by simply making the ski core thinner or thicker.

Referring again to FIG. 1, it will be seen that rack 42 holding a plurality of spools 44 of fiberglass roving is also disclosed. Fiberglass strands 46, which are drawn from each of the spools 44, are directed over guide ring 48 through openings 51 in circular track 16 of the braiding machine 12 (FIG. 2), over circular guide ring 26, through circular guide ring 20 and into the braiding nip area 22. It will be understood that the openings 51 on track 16 of the braiding machine do not move and, thus, strands 46 are not truly braided in braiding nip 22, but rather are merely intertwined with braided strands 18. Fiberglass strands 46, while intertwined with strands 18, maintain their longitudinal direction along the ski core 24 and, thus, add to the longitudinal stiffness of the completed ski.

Figure 8:
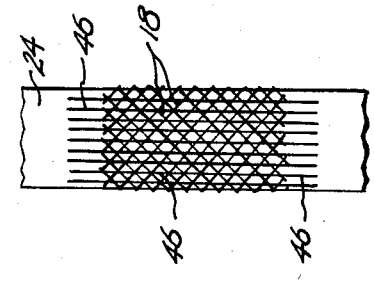
FIG. 8 is a top, plan view of a portion of a ski core showing angularly biased braid including longitudinally extending fibers intertwined therewith.

Referring to FIG. 8, the longitudinal strands 46 are shown intertwined with the angularly biased braided strands 18. This three-strand fiberglass sock is tightly woven onto the ski core and conforms closely to its outer dimensions. It will be understood that the braided strands 18 of the three-strand braided sock of FIG. 8 may still be varied in angular orientation by speeding or slowing the movement of the ski core through the braiding machine, or the speeding or slowing of the braiding machine itself.

Referring again to FIG. 1, it will be noted that racks 42 hold other spools 50 of fiberglass material, the strands 52 of which are led to fiber guide 54 which is best shown in FIGS. 3 and 4. Fiber guide 54 includes a strand receiving screen 56 comprising a metal plate having a plurality of holes 57 positioned above and below opening 58 through which ski core 24 passes. Holes 57 direct strands 52 toward springs 60 positioned above and below the ski core near the opposite end of fiber guide 54. As best shown in FIG. 5, springs 60 are end mounted in vertically oriented posts 66 and spiral about pins 62, which may be conventional bolts and nuts and which are, in turn, mounted in openings 64 in posts 66.

Fiberglass strands 52 are locked in springs 60 by removing pins 62 therefrom, pulling the fiberglass upwardly or downwardly through springs 60 and then reinserting locking pins 62. As shown in FIG. 5, fiber strands 52 are then locked beween springs 60 and pins 62.

Strands 52 then extend through guide ring 20 and onto the top and bottom surfaces of the ski core in nip area 22 where they are covered and held by braided strands 18 and intertwined longitudinal strands 46.

It will be understood that strands 52 may be formed of fiberglass similar to longitudinal strands 46, or may be fiberglass roving, or any other material having a characteristic useful in ski manufacture such as carbon, kevlar, polyester, metal wire or the like.

It will also be understood that unequal amounts of fiber material may be deposited on the top or bottom surface of the ski core as desired by varying the number of spools of material feeding fiber strands to the upper or lower guide holes 57 of plate 56. While only a pair of spools have been shown feeding strands of material to the fiber guide in FIG. 1, it will be understood that many more spools will actually be used during ski production.

Figure 6:
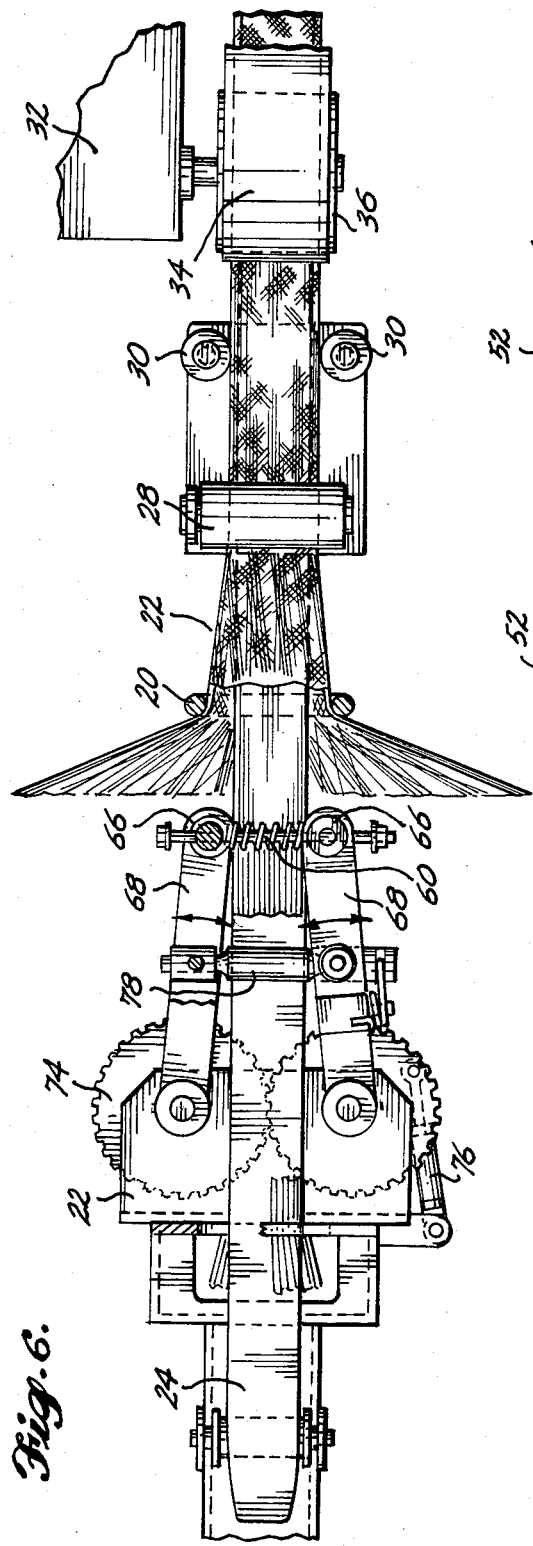
FIG. 6 is a top, plan view of the apparatus of FIG. 4.

Referring additionally to FIG. 6, it will be seen that vertical posts 66 are mounted on pivoting arms 68. The distal ends of arms 68 are mounted upon pivotal vertical shafts 70 which extend downwardly through fiber guide support plate 72. Meshing toothed gears 74 are fixedly mounted to the bottom of each shaft 70 such that the angular rotation of one shaft 70 caused by the inward or outward movement of the distal end of arms 68 as a ski core 24 moves therebetween is equally imparted to the other shaft 70 through gears 74.

A conventional cylinder and piston arrangment 76 is mounted to the periphery of one of the toothed gears 74 to angularly bias the gear, interconnected arms 68 and posts 66 against the lateral side of ski core 24. In this way, as the width of the ski core narrows or widens as it passes between posts 66, arms 68 are continuously biased against the sides of the ski core and move inwardly and outwardly therewith.

Since, as best shown in FIG. 5, the ends of springs 60 are fixedly mounted in posts 66, the lateral movement of posts 66 as ski core of varying width passes therebetween causes springs 60 to flex inwardly and outwardly. Since fiberglass strands 52 are captured beneath the turns of springs 60, the strands are also moved inwardly and outwardly as springs 60 flex and, in this way, fiberglass strands 52 are variably spaced or contoured with respect to the upper and lower surfaces of ski core 24 on which they are deposited as the width of the ski core varies.

As is best shown in FIG. 4, upper and lower guide rollers 78 are also mounted on the arms 68 of fiber guide 54 and at least the upper roller is biased downwardly against the top of ski core 24 by means of a conventional spring 80 mounted on the side of arm 68.

Figure 9:
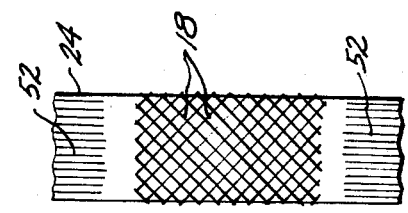
FIG. 9 is a plan view of a portion of a ski core showing angularly biased braid overlying longitudinally extending fibers positioned on the top surface of a ski core.

Referring to FIG. 9, strands of longitudinal material positioned on the top surface of ski core 24 and captured by angularly biased braid 18 are disclosed.

Figure 10:
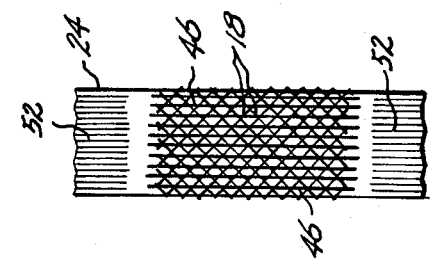
FIG. 10 is a plan view of a portion of a ski core showing angularly biased braid including intertwined longitudinally extending fibers overlying longitudinally extending fibers positioned on the top surface of a ski core.

Referring to FIG. 10, longitudinally extending strands 52 extending beneath and captured by angularly biased strands 18 and intertwined longitudinally extending strands 46 are disclosed. It will be understood that any of the braided fiberglass covered ski core constructions shown in FIGS. 7-10 are considered to be novel products of the present invention. These fibers are braided and placed directly on a moving ski core in a continuous fashion to produce structures having improved characteristics not heretofore available in the art.

The above-described apparatus and the method of manufacturing these and other unique braided ski cores are also considered to be novel features of this invention.

It is contemplated that varying the speed of movement of a ski core through the braiding machine, or varying the speed of the braiding machine as a ski core moves therethrough, will allow the impartation of differing flex patterns along the length of a single ski core. It is also contemplated that the speed of travel of the ski core or the speed of the braiding machine may be automatically controlled in a known manner to allow ski cores of a preselected flex pattern to be repeatedly and uniformly produced.

As will be apparent to those skilled in the art to which the invention is addressed, the present invention may be embodied in forms other than those specifically disclosed above without departing from the spirit or essential characteristics of the invention. The particular embodiment of the apparatus, method and product described above is therefore to be considered in all respects as being merely illustrative of one form of apparatus, method and product capable of carrying out the present invention.

The scope of the invention is as set forth in the appended claims, rather than in the foregoing description.

The embodiments of the invention in which an exclusive property or privilege is claimed are defined as follows:

1. A wrapped ski core comprising:
   a longitudinal core, and,
   a plurality of continuous strands of a first set of fibers helically surrounding said core said fibers braided snugly thereon, conforming to the surface of said core; said braided strands of the first set of fibers being biased at an angle with respect to the longitudinal dimension of said core.

2. A wrapped core for a ski comprising:
   a longitudinal core having a laterally narrowed waist portion;
   a plurality of first continuous strands of fiber braided thereon and conforming to the surface dimensions of said core; said braided strands being helically wrapped about said core and biased at angles with respect to the longitudinal dimension of said core;
   a plurality of second strands of fiber being interwoven with said first strands and aligned with the longitudinal dimension of said core.

3. The wrapped core of claim 2, wherein said first strands are double the number of said second strands such that the number of strands biased at angles to the longitudinal dimension of said core is twice the number of strands aligned longitudinally thereto.

4. The wrapped core of claim 1, wherein said longitudinal core is formed of either foamed plastic or wood.

5. The wrapped core of claim 1, further including a plurality of longitudinally extending strands of a second set of fibers interwoven with said braided angularly biased strands of the first set of fibers.

6. The wrapped core of claim 5, further including a plurality of longitudinally extending strands of a third set of fibers positioned on at least one of the top and bottom sides of said core beneath said strands of the first and second sets of fibers.

7. The wrapped core of claim 6, wherein the number of strands of the third set of fibers is varied to alter the flexibility or stiffness of said ski.

8. The wrapped core of claim 6, wherein the strands of the third set of fibers are formed from material selected from the group consisting of fiberglass, carbon, aramid and polyester.

9. The wrapped core of claim 6, wherein the strands of said third set of fibers are laterally spaced from each other at greater or smaller distances corresponding to the width of the ski core.

10. The wrapped core of claim 5, wherein the strands of the first and second set of fibers are disposed in a triaxial pattern on the core along two axial directions extending diagonally to the length of the core and a third axial direction extending along the length of the core.

11. The wrapped core of claim 5, wherein the strands of the second set of fibers are positioned on at least one of the top and bottom sides of said core.

12. The wrapped core according to claim 11, wherein the number of the strands of the second set of fibers is altered to vary the flexibility or stiffness of the ski.

13. The wrapped core of claim 5, wherein the strands of the second set of fibers are formed of material selected from the group consisting of fiberglass, carbon, aramid and polyester.

14. The wrapped core of claim 1, wherein the angle of said strands of the first set of fibers with said longitudinal ski core is changed along the length of said ski to vary the torsional and longitudinal stiffness of said ski along its length.

15. The wrapped core of claim 1, wherein the strands of the first set of fibers are disposed about said core in a pattern along two axial directions extending longitudinally to the length of said core.

16. The wrapped core of claim 1, wherein said core has a laterally narrowed waist portion.

17. The wrapped core of claim 1, wherein the strands of said first set of fibers are composed of material selected from a group consisting of fiberglass, carbon, aramid and polyester.

18. The wrapped core of claim 1, further including a plurality of longitudinally extending strands of a third set of fibers positioned on at least one of the top and bottom sides of the core beneath the strands of said first set of fibers.

19. The wrapped core of claim 18, wherein the number of the strands of the third set of fibers is varied to alter the flexibility of stiffness of the ski.

20. The wrapped core of claim 18, wherein the strands of the third set of fibers are laterally spaced from each other at greater or smaller distances corresponding to the width of the ski core.

21. The wrapped core of claim 18, wherein the strands of the third set of fibers are formed from material selected from the group consisting of fiberglass, carbon, aramid and polyester.

22. A method of wrapping a ski core comprising the steps of:
    moving a ski core longitudinally along a path through a braiding machine;
    braiding continuous strands of a first set of reinforcing fibers about said core from the leading end of said core to the trailing end such that said strands are angularly oriented with respect to the length of said core; and,
    maintaining tension on said strands during braiding.

23. The method of claim 22, wherein the first set of strands are braided about the core in a pattern along two axial directions extending diagonally to the length of the core.

24. The method of claim 22, further including the step of varying the angle of orientation of the strands of the first set of fibers with respect to said core along the length of said core to change the torsional and longitudinal stiffness of a ski incorporating said ski core along its length.

25. The method of claim 22, further including the step of positioning a second set of strands of reinforcing fibers, longitudinally along at least one of the top and bottom sides of the ski core and intertwining the second set of strands with the first set of strands.

26. The method of claim 25, wherein the strands of the first and second set of fibers are disposed in a triaxial pattern on the core along two axial directions extending diagonally to the length of the core and a third axial direction extending along the length of the core.

27. The method of claim 25, further including the step of feeding a third set of strands of reinforcing fiber along at least one of the top and bottom sides of the core as the first and second sets of strands are braided and intertwined thereon to capture and hold the strands of the third set of fibers beneath the strands of the first and second sets of fibers.

28. The method of claim 27, further including the step of contouring the strands of the third set of fibers to the width of the core so that the strands of the third set of fibers are spaced further apart from each other where the width of the core is enlarged and closer to each other where the width of the core is narrowed.

29. The method of claim 27, wherein the number of the strands of the third set of fibers is varied to alter the flexibility or stiffness of the ski.

30. The method of claim 27, wherein at least one of the first, second and third sets of fibers of strands are composed of material selected from the group consisting of fiberglass, carbon, aramid and polyester.

31. The method of claim 22, further including the step of positioning a third set of reinforcing fibers on at least one of the top and bottom sides of the core as the strands of the first set of fibers are braided on the core whereby the strands of the third set of fibers are captured and held beneath the strands of the first set of fibers.

32. The method of claim 31, including the step of contouring the strands of the third set of fibers to the width of the core such that the strands of the third set of fibers are spaced further apart from each other where the width of said core is enlarged and closer to each other where the width of said core is narrowed.

33. The method of claim 31, wherein the number of the strands of the third set of fibers is varied to alter the flexibility or stiffness of the ski.

34. In a ski having a longitudinally extending body portion and an upturned tip portion, an improved reinforcing fiber wrapped internal core, comprising:
a plurality of continuous strands of a first set of fibers braided upon said internal core and conforming snugly to the surface thereof, said strands of the first set of fibers lying at angles to the length of said core.

35. The improvement of claim 34, wherein the strands of the first set of fibers are disposed about said core in a pattern along two axial directions extending longitudinally to the length of said core.

36. The improvement of claim 34, wherein said core has a laterally narrowed waist portion.

37. The improvement of claim 36, wherein said core is formed from either foamed plastic or wood.

38. The improvement of claim 34, wherein the strands of said first set are composed of material selected from the group consisting of fiberglass, carbon, aramid and polyester.

39. The improvement of claim 34, wherein the angle of the strands of the first set of fibers relative to the longitudinal direction of the ski core is changed along the length of said core to vary the torsional and longitudinal stiffness of said ski along its length.

40. The improvement of claim 34, further including a plurality of longitudinally extending strands of a second set of reinforcing fibers intertwined with said braided first strands.

41. The improvement according to claim 40, wherein the strands of the first and second sets of fibers are disposed in a triaxial pattern on said core along two axial directions extending diagonally to the length of said core and a third axial direction extending along the length of said core.

42. The improvement of claim 40, wherein the strands of the second set of fibers are formed from material selected from the group consisting of fiberglass, carbon, aramid and polyester.

43. The improvement of claim 40, further including longitudinally oriented strands of a third set of reinforcing fibers positioned on at least one of the top and bottom sides of said ski core beneath said first and second sets of strands.

44. The improvement of claim 43, wherein said third strands are laterally spaced from each other at greater or smaller distances depending upon the width of said ski core.

45. The improvement according to claim 43, wherein the number of the strands of the third set positioned on the top or bottom of said core is varied to alter the flexibility or stiffness of the ski.

46. The improvement of claim 43, wherein the strands of the third set are formed from material selected from the group consisting of fiberglass, carbon, aramid and polyester.

47. The improvement of claim 34, further comprising a plurality of longitudinally extending strands of a third set of fibers positioned on at least one of the top and bottom sides of said core beneath the strands of the first set of fibers.

48. The improvement of claim 47, wherein the number of the strands of the third set of fibers positioned on the top or bottom of said core is varied to alter the flexibility or stiffness of the ski.

49. The improvement of claim 47, wherein the strands of the third set of fibers are formed from material selected from the group consisting of fiberglass, carbon, aramid and polyester.

50. The improvement of claim 47, wherein the strands of the third set of fibers are laterally spaced apart from each other at greater or smaller distances corresponding to the width of said core.

* * * * *